(12) United States Patent
Kurimoto et al.

(10) Patent No.: US 7,191,875 B2
(45) Date of Patent: Mar. 20, 2007

(54) DISC BRAKE

(75) Inventors: Seiji Kurimoto, Saitama (JP); Kuniaki Wakamatsu, Saitama (JP); Hidetoshi Toyoda, Saitama (JP); Shinichi Kuwahara, Saitama (JP)

(73) Assignee: Honda Giken Kogyp Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/184,969

(22) Filed: Jul. 1, 2002

(65) Prior Publication Data
US 2003/0024777 A1 Feb. 6, 2003

(30) Foreign Application Priority Data
Aug. 1, 2001 (JP) ............... 2001-234059

(51) Int. Cl.
*F16D 55/18* (2006.01)
(52) U.S. Cl. .................. 188/72.4; 188/71.8; 277/350; 277/345; 277/587
(58) Field of Classification Search ............... 188/71.5, 188/72.3, 72.4, 72.5, 190 P; 277/468, 453, 277/492, 586, 587, 345, 350, 357; 92/165 P–168
See application file for complete search history.

(56) References Cited

U.S. PATENT DOCUMENTS 2,019,757 A * 11/1935 Loweke ...................... 277/453
2,765,204 A * 10/1956 Josephson .................... 277/492
3,614,114 A * 10/1971 Traub .......................... 277/589
4,014,414 A * 3/1977 Yamamoto et al. ......... 188/170
4,252,331 A * 2/1981 Siegel ......................... 277/144
4,714,259 A * 12/1987 Mack et al. ................. 277/586
5,325,940 A * 7/1994 Rueckert et al. ........... 188/71.8
5,328,177 A * 7/1994 Lair et al. .................... 277/311
5,826,681 A * 10/1998 Kubo et al. ................. 188/71.8
6,073,733 A * 6/2000 Kapanowski ............... 188/72.4
6,502,826 B1 * 1/2003 Schroeder et al. .......... 277/468

FOREIGN PATENT DOCUMENTS

JP 59-58241 A * 4/1984 ................ 188/71.5
JP 9-72361 A 3/1997
JP 11-270600 A * 10/1999

* cited by examiner

*Primary Examiner*—James McClellan
*Assistant Examiner*—Mariano Sy
(74) *Attorney, Agent, or Firm*—Birch, Stewart, Kolasch & Birch, LLP

(57) ABSTRACT

A disc brake includes a piston seal made of rubber that is shaped to fit into a seal groove on the inner surface of a cylinder of a caliper for a brake piston. To prevent braking effectiveness from being impaired, even if the temperature of a caliper rises in a disc brake for a vehicle, the piston seal and/or the seal groove is shaped to control and contain the effects of thermal expansion due to the heat of the disc brake. The clearance between the piston seal and the seal groove is removed and clearance is provided between parts of the periphery of the piston seal and the seal groove.

17 Claims, 4 Drawing Sheets

DISC BRAKE

CROSS-REFERENCE TO RELATED APPLICATIONS

The present application claims priority under 35 USC 119 to Japanese Patent Application No. 2001-234059 filed on Aug. 1, 2001 the entire contents thereof is hereby incorporated by reference.

BACKGROUND OF THE INVENTION

1. Field of the Invention

The present invention relates to a disc brake for a vehicle, such as an automobile or a motorcycle. More particularly, to piston seals and seal grooves for the disc brake.

2. Description of the Background Art

For this type of brake, a brake piston slides in and out of a caliper at the driver's command and places pressure on the disc brake to stop or slow the vehicle. For example, a disc brake is disclosed in Japanese published unexamined patent application No. Hei 9-72361.

As shown in FIG. 10(a), a brake piston 02 is inserted into a cylinder 01 of a caliper for slideably mounting the brake piston. Located on the left side in FIG. 10(a), a pad and others are pressed upon a brake disc, not shown, by applying hydraulic pressure to the other side (the right side in FIG. 10(a)) of the brake piston 02. As a result, the rotation of the brake disc is stopped. A piston seal 03 made of rubber and having a rectangular or trapezoidal section is set on a seal groove 04 that works on the inner surface of the cylinder 01 of the caliper. A large clearance (space) 04a is provided in the seal groove 04 in a direction in which the brake piston 02 is slid (particularly on the hydraulic side of the brake piston 02).

In the conventional type disc brake, when the temperature of the cylinder 01 rises, the piston seal 03 is also heated, and as shown by black arrows in FIG. 10(b), the piston seal is expanded towards the clearance 04a on the side of the application of hydraulic pressure in the seal groove 04. Consequently, the brake piston 02 is also pushed back on the side of hydraulic pressure as shown by a white arrow in FIG. 10(b) and the amount of play of the brake is increased. More specifically, due to the play in the brake, braking effectiveness will vary.

In the conventional type disc brake, air is apt to accumulate in the large clearance 04a in the seal groove 04 and the braking effectiveness (the touch feeling of the brake) is deteriorated. In addition, as shown by an arrow in FIG. 11, when the piston seal 03 which has a rectangular section is inserted into the seal groove 04, there is also a problem that a corner 05 may be caught and the piston seal 03 is often inserted with a twist.

The temperature of the cylinder 01 may sometimes exceed 100 degrees Celsius. It is known that the condition of the grip of a brake lever varies when the temperature rises, as described above. This variation in the condition of the grip is considered to be mainly caused by the thermic deflection of the cylinder 01 and the brake piston 02. However, as a result of examination and research by the present inventors, the main cause is that the brake piston 02 is pushed back by the thermal expansion of the piston seal 03. When the temperature of the cylinder 01 rises up to approximately 100 degrees Celsius, the brake piston 02 is pushed back up to approximately a few tens μm.

SUMMARY OF THE INVENTION

The present invention, which has solved the above-mentioned problems of the conventional type, relates to a disc brake, wherein, a piston seal made of rubber is fitted into a seal groove on the inner surface of a cylinder of a caliper for a brake. A brake piston and the cylinder are liquid-sealed by the piston seal. The present invention substantially removes the clearance between the piston seal and the seal groove in a direction in which the brake piston is slid. A clearance is provided between other areas of the periphery of the piston seal and the seal groove.

The present invention is configured and described above with a substantial removal of the clearance between the piston seal and the seal groove in a direction in which the brake piston is slid. The brake piston is never pushed back by the thermal expansion of the piston seal. Since a clearance is provided between the periphery of the piston seal and the seal groove, the thermal expansion of the piston seal can be absorbed without having an effect upon the movement of the brake piston.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
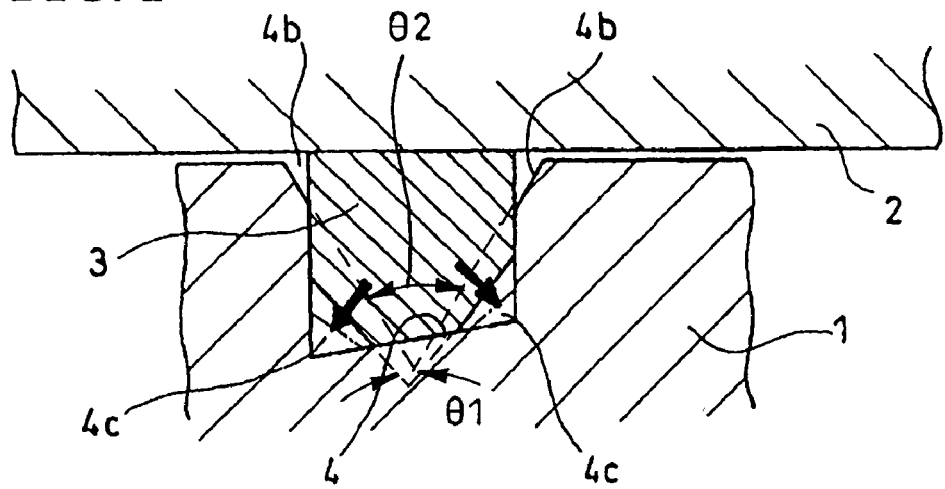
FIG. 1 is a sectional view showing the shape of a piston seal according to a first embodiment of the present invention.

FIG. 1 is a sectional view showing the circumference of a piston seal 3 in the first embodiment of the invention. In this embodiment, each width (the dimension in a direction in which a brake piston 2 is slid) of the piston seal 3 and a seal groove 4 is substantially the same or the width of the seal groove 4 is set to a smaller value. As a result, the piston seal 3 is not expanded in an axial direction of the brake piston 2 and movement in the sliding direction is regulated. Therefore, the brake piston 2 is never pushed back and when the temperature rises. Thus, the characteristic (particularly, the quantity of play) of a brake can be stabilized.

Clearance between the seal groove 4 and the piston seal 3 is minimized adjacent to where the piston seal 3 is in contact with the brake piston 2. Instead, however, space 4b and space 4c are provided at the bottom of the seal groove 4 (away from where the piston seal 3 makes contact with the brake piston 2) by chamfering the outer peripheral corners of the piston seal 3. With the chamfering, the piston seal 3 has a hexagonal-shaped cross section. Chamfering the outer peripheral corners of the piston seal 3 makes it possible for an expanded part of the piston seal 3 to be relieved into the space 4b and space 4c when the temperature rises, as shown by arrows in FIG. 1.

Further, since a large air reservoir space is not provided in this embodiment, air bleeding work is easy and the touch feel of the brake is also stabilized.

In addition, in this embodiment, as the peripheral corner of the piston seal 3 is chamfered, the piston seal is not caught when the piston seal is inserted into the seal groove 4. Therefore, the assembly of a caliper (the assembly of the seal) is facilitated.

A cylinder 1 and the brake piston 2 are made of metal such as aluminum and the quantity of the deformation due to thermal expansion is smaller, compared with that of the piston seal 3 made of rubber.

Figure 2:
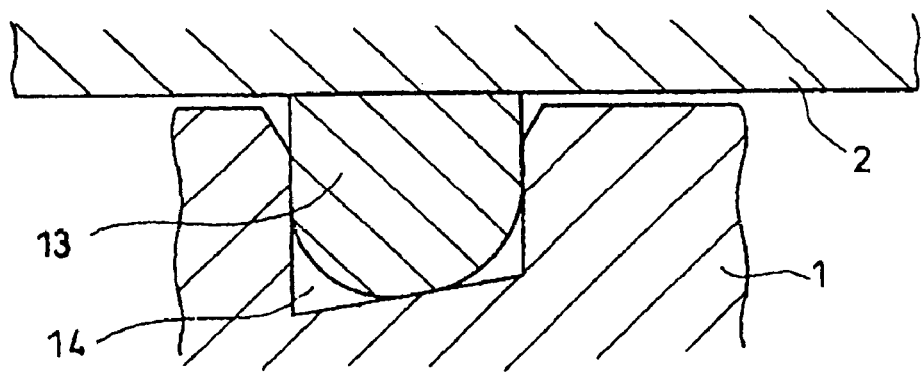
FIG. 2 is the similar sectional view according to a second embodiment of the present invention.

Next, FIGS. 2 to 9 are sectional views showing other various embodiments (transformed examples) of the present invention. As shown in FIG. 2, the corner of a piston seal 13 is rounded, and when the piston seal is inserted into a seal groove 14, the corner is not caught and not twisted more than in the first embodiment.

Figure 3:
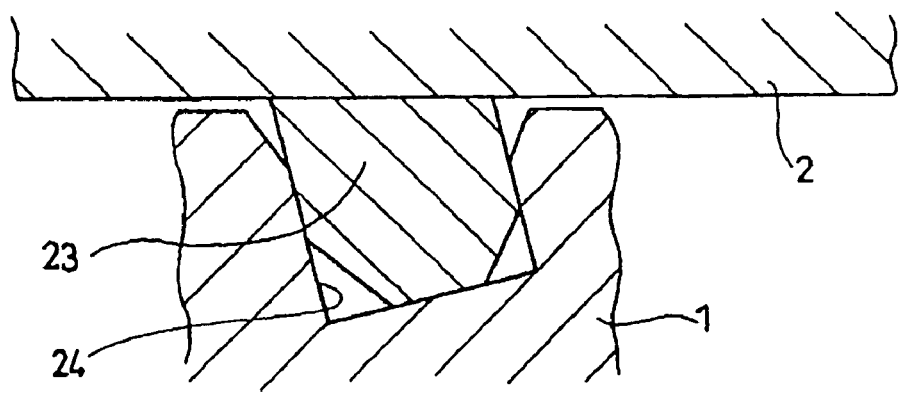
FIG. 3 is the similar sectional view according to a third embodiment of the present invention.
Figure 4:
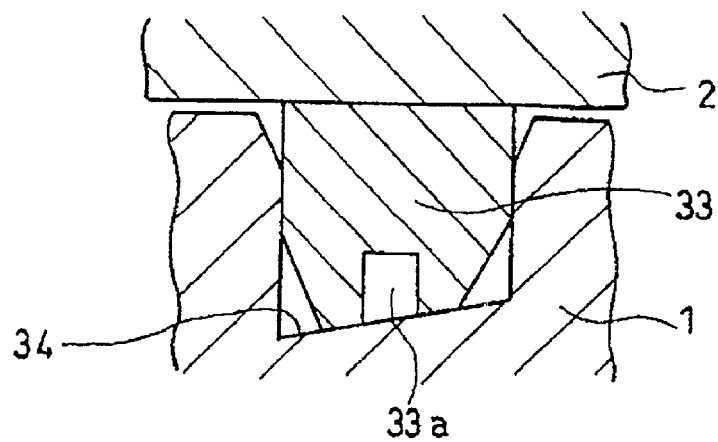
FIG. 4 is the similar sectional view according to a fourth embodiment of the present invention.
Figure 5:
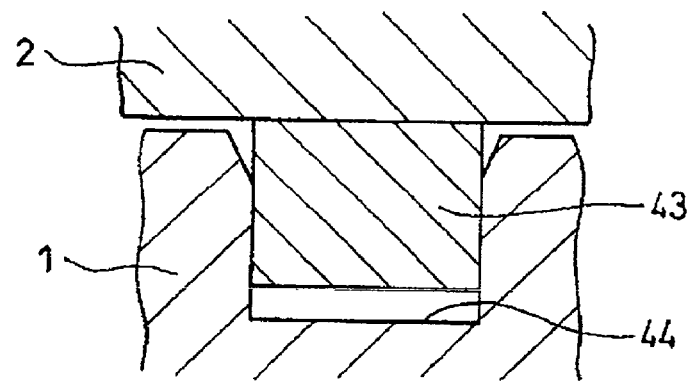
FIG. 5 is the similar sectional view according to a fifth embodiment of the present invention.
Figure 6:
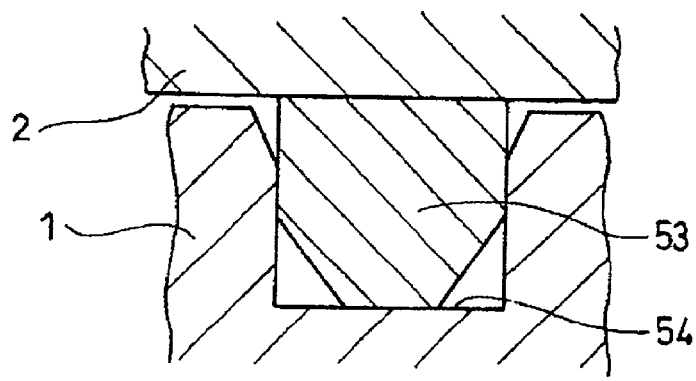
FIG. 6 is the similar sectional view according to a sixth embodiment of the present invention.
Figure 7:
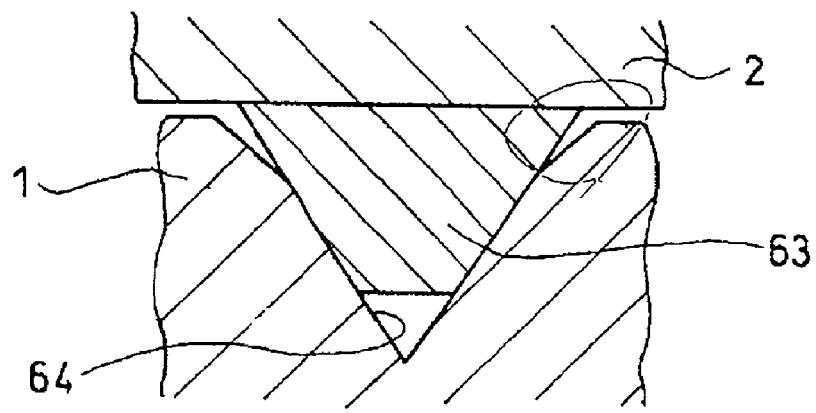
FIG. 7 is the similar sectional view according to a seventh embodiment of the present invention.
Figure 8:
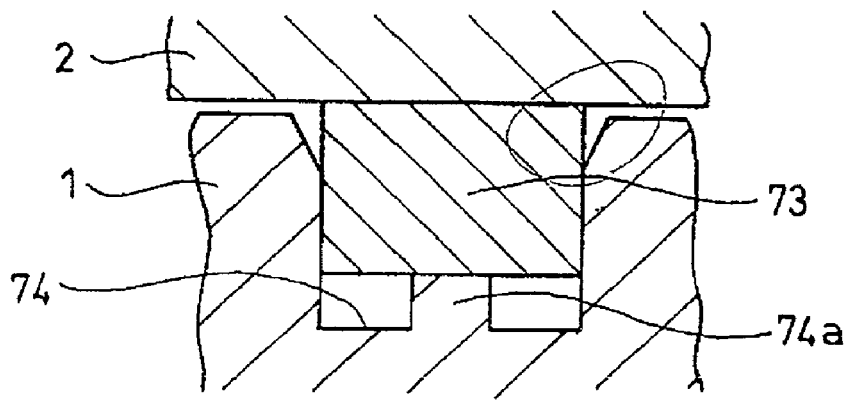
FIG. 8 is the similar sectional view according to an eighth embodiment of the present invention.

FIG. 3 shows a seal groove 24, the side of which is inclined. FIG. 4 shows a piston seal 33, the side of which shows a concave groove 33a, and seal groove 34. FIG. 5 shows a space provided between the side of a piston seal 43 and the bottom of a seal groove 44. In addition, FIG. 6 shows a seal groove 54 wherein the bottom is parallel with the inner surface of a cylinder 1 which is different from FIG. 1. FIG. 7 shows the combination of a triangular seal groove 64 and a trapezoidal piston seal 63. FIG. 8 shows projections 74a provided to the bottom of a seal groove 74.

In any transformed example, as in the first embodiment shown in FIG. 1, substantially no clearance is provided between the piston seal and the seal groove in a direction in which a brake piston 2 is slid. However, a clearance (space) is provided between parts of the periphery of the piston seal and the seal groove. Thus, a similar action and effect to the action and effect in the first embodiment can thereby be produced.

Figure 9:
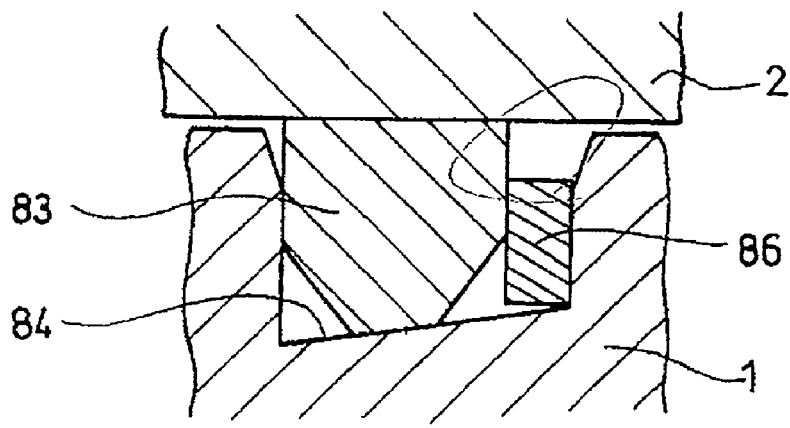
FIG. 9 is the similar sectional view according to a ninth embodiment of the present invention.
Figure 10A:
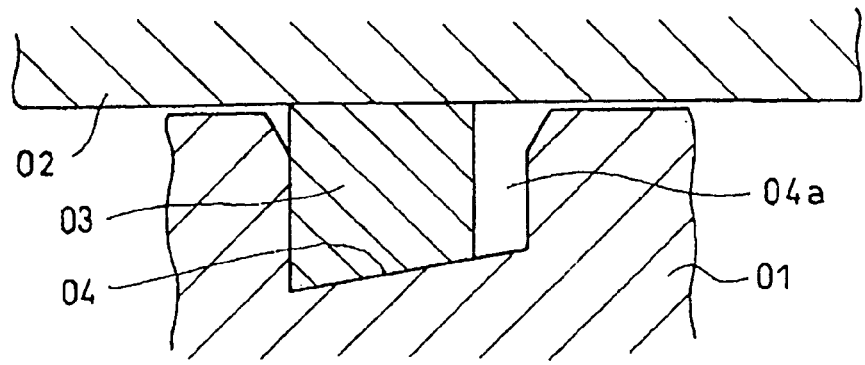
FIGS. 10(a) and 10(b) are sectional views showing the shape of a piston seal according to a conventional type disc brake.
Figure 10B:
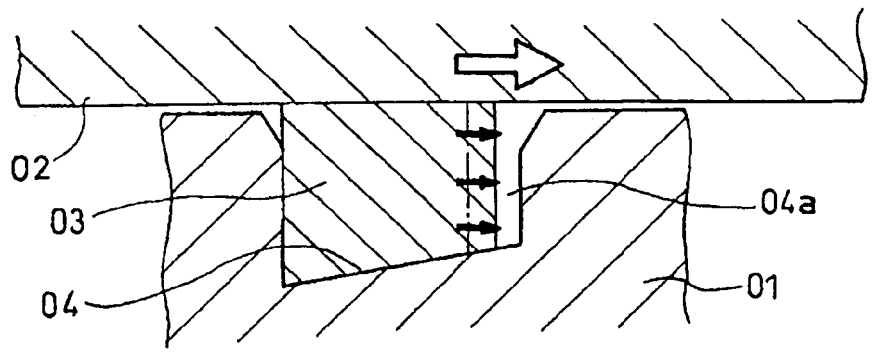
Figure 11:
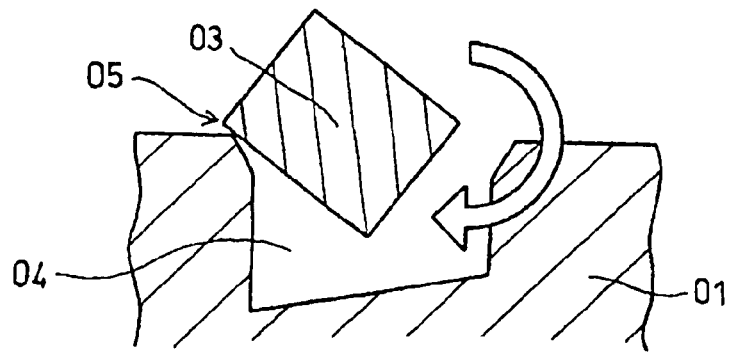
FIG. 11 is a sectional view showing a state in which the piston seal is inserted in the conventional type disc brake.

FIG. 9 shows an example where a spacer 86 is inserted into a seal groove 84 as another piece of a piston seal 83. In this embodiment a similar action and effect are also produced. The spacer 86 may be constructed of a material in which thermal expansion is hardly caused. Suitable material would be, for example, aluminum and resin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc brake comprising:
    a seal groove located on an inner surface of a cylinder of a caliper for a brake, the seal groove consisting of five surfaces, the five surfaces consisting of:
    first and second chamfered parts respectively provided on opposite peripheral edges of the seal groove,
    a first side wall extending radially outward from an outer edge of the first chamfered part,
    a second side wall extending radially outward from an outer edge of the second chamfered part, and
    a bottom side of the seal groove extending between the first side wall and the second side wall, and forming one inside corner having an acute angle, and forming another inside corner having an obtuse angle, the corner with the obtuse angle being on a side of hydraulic pressure;
    a piston seal with a cross-section consisting of six contiguous surfaces fitted into the seal groove, two of the surfaces of the piston seal being flat surfaces facing and contacting the two side walls of the seal groove, and two other surfaces being chamfered surfaces on outer peripheral edges of the piston seal in order to provide a closed annular space in each of the bottom inside corners of the seal groove; and
    a brake piston, said brake piston and the cylinder are sealed by the piston seal wherein substantially no clearance is provided between the piston seal and the seal groove in a direction in which the brake piston is slid,
    wherein peripheral clearances are formed between inner portions of the piston seal and the first and second chamfered parts respectively provided on the opposite peripheral edges of the seal groove.

2. The disc brake according to claim 1,
    wherein the surfaces of the piston seal orthogonal to the direction in which the brake piston is slid are flat, and the thickness between the surfaces is substantially equal to a width of the seal groove.

3. The disc brake according to claim 1, wherein an angle between the chamfered portions formed on the piston seal is less than 90° but greater than an angle between the chamfered parts on the cylinder adjacent to the brake piston.

4. The disc brake according to claim 1, wherein the piston seal is a formed of a single piece of material.

5. The disc brake according to claim 1, wherein the flat surfaces of the piston seal are uninterrupted surfaces extending outwardly from the brake piston to the first and second chamfered portions on outer peripheral edges of the piston seal.

6. The disc brake according to claim 1, wherein the piston seal contacts the side walls of the seal groove between the chamfered parts and the chamfered surfaces.

7. A disc brake comprising:
    a seal groove located on an inner surface of a cylinder of a caliper for a brake, the seal groove including first and second side walls which are flat, a bottom wall of the seal groove, one inside corner formed as an acute angle between the first side wall and the bottom wall, and another inside corner formed as an obtuse angle between the second side wall and the bottom wall, the inside corner with the obtuse angle being on a side of hydraulic pressure;

a piston seal made of rubber fitted into the seal groove, the piston seal having a cross-section with six contiguous surfaces, including two flat surfaces facing the two side walls of the seal groove, and first and second chamfered portions on outer peripheral edges of the piston seal, the first and second chamfered portions respectively facing the two inside corners of the seal groove, thus providing a closed annular space in each of the inside corners of the seal groove;

a brake piston, said brake piston and the cylinder being liquid-sealed by the piston seal;

first and second chamfered parts respectively provided on opposite peripheral edges of the seal groove and providing peripheral clearances between inner portions of the flat surfaces of the piston seal and the seal groove, so that only the flat surfaces of the piston seal make contact with the seal groove, the first chamfered part extending between the first side wall of the seal groove and the inner surface of the cylinder, and the second chamfered part extending between the second side wall of the seal groove and the inner surface of the cylinder, wherein the seal groove consists of five surfaces and the piston seal consists of six surfaces.

8. The disc brake according to claim 7, wherein each of the side walls of the seal groove extends in a direction substantially perpendicular to a cylinder axis.

9. The disc brake according to claim 7, wherein an angle between the chamfered portions formed on the piston seal is less than 90° but greater than an angle between the chamfered parts on the cylinder adjacent to the brake piston.

10. The disc brake according to claim 7, wherein the piston seal is a formed of a single piece of material.

11. The disc brake according to claim 7, wherein the flat surfaces of the piston seal are uninterrupted surfaces extending outwardly from the brake piston to the first and second chamfered portions on outer peripheral edges of the piston seal.

12. The disc brake according to claim 7, wherein the two flat surfaces of the piston seal contact the side walls of the seal groove between the chamfered parts and the chamfered portions.

13. A disc brake comprising:
a seal groove located on an inner surface of a cylinder of a caliper for a brake, the seal groove including:
first and second chamfered parts respectively provided on opposite peripheral edges of the seal groove,
a first side wall extending radially outward from an outer edge of the first chamfered part,
a second side wall extending radially outward from an outer edge of the second chamfered part, and
a bottom side of the seal groove extending between the first side wall and the second side wall, and forming one inside corner having an acute angle, and forming another inside corner having an obtuse angle, the corner with the obtuse angle being on a side of hydraulic pressure;

a piston seal with a cross-section with six contiguous sides fitted into the seal groove, the piston seal having flat surfaces facing the two side walls of the seal groove, and two other surfaces being chamfered on outer peripheral edges of the piston seal in order to provide a space in each of the bottom inside corners of the seal groove; and a brake piston, said brake piston and the cylinder are sealed by the piston seal wherein substantially no clearance is provided between the piston seal and the seal groove in a direction in which the brake piston is slid, wherein an angle between the chamfered portions formed on the piston seal is less than 90° but greater than an angle between the chamfered parts on the cylinder adjacent to the brake piston.

14. The disc brake according to claim 13, wherein the seal groove consists of five surfaces and the piston seal consists of six surfaces.

15. The disc brake according to claim 13, wherein the first and second chamfered parts respectively provided on opposite peripheral edges of the seal groove provide a periphery clearance between inner portions of the flat surfaces of the piston seal and the seal groove, so that only the flat surfaces of the piston seal make contact with the seal groove.

16. The disc brake according to claim 13, wherein the piston seal is a formed of a single piece of material.

17. The disc brake according to claim 13, wherein the flat surfaces of the piston seal are uninterrupted surfaces extending outwardly from the brake piston to the first and second chamfered portions on outer peripheral edges of the piston seal.

* * * * *